April 16, 1929.  V. K. ZWORYKIN  1,709,647
VARIABLE LIGHT SOURCE
Filed March 17, 1924
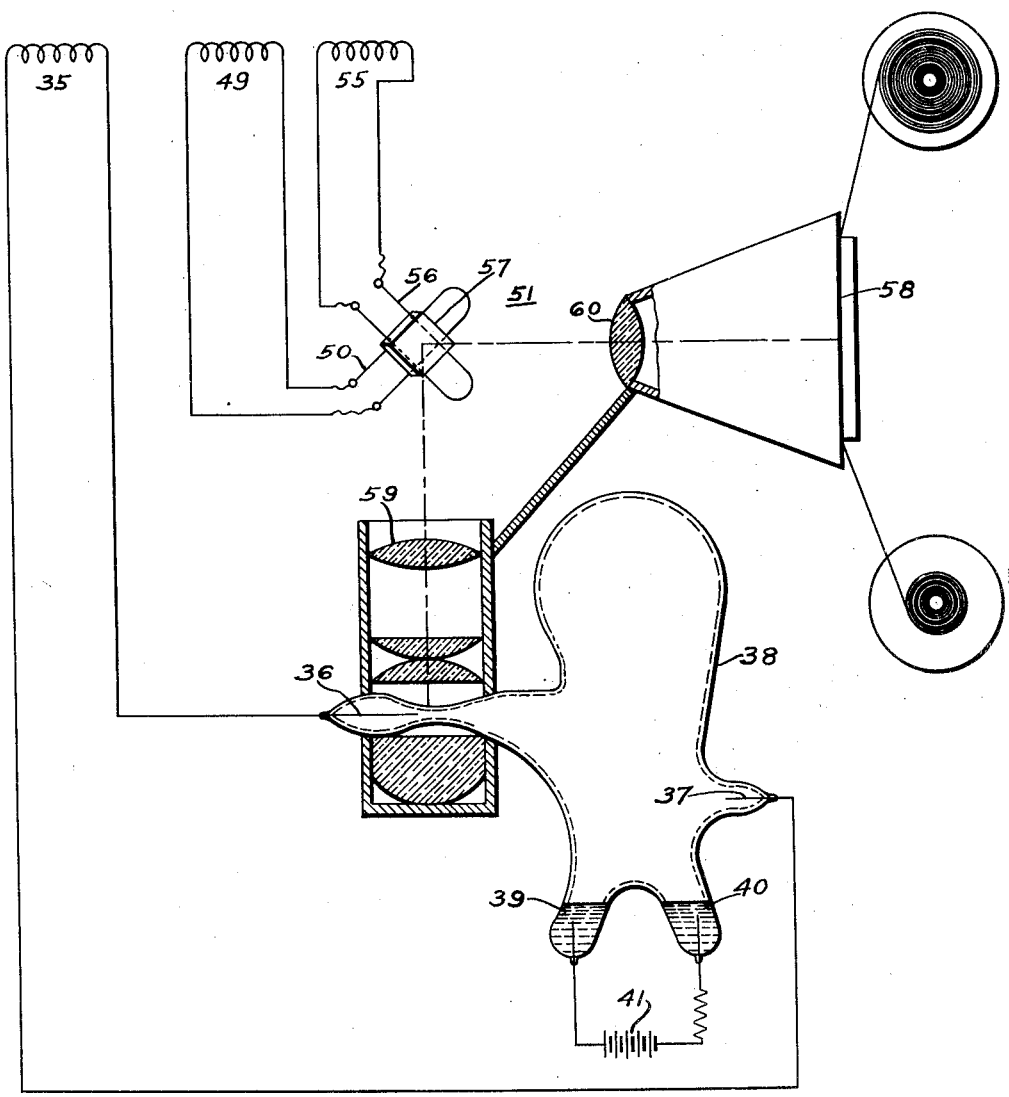
INVENTOR
Vladimir K. Zworykin
BY
Wesley Sloan
ATTORNEY

Patented Apr. 16, 1929.

1,709,647

UNITED STATES PATENT OFFICE.

VLADIMIR K. ZWORYKIN, OF WILKINSBURG, PENNSYLVANIA.

VARIABLE LIGHT SOURCE.

Application filed March 17, 1924. Serial No. 699,631.

My invention relates, in general, to television systems.

One object of my invention is to provide improved means for controlling the light source at the receiving station in accordance with the variations in light reflected by the image at the object of the transmitting station.

A further object of my invention is to provide improved means for recording the variations in light.

There are other objects of the invention which, together with the foregoing, will be described hereinafter with reference to the accompanying drawings forming part of the specification.

The single figure of the drawing is a diagrammatic representation of the light source and the portions of the circuit immediately associated therewith.

At the receiving station, circuits are provided for detecting the carrier current which is modulated at two frequencies at the sending station and this current is demodulated and applied to two windings of the "assembling" oscillograph element. This oscillograph element then has the same motion as the transmitting element and operates in synchronism therewith. The light source of the oscillograph element is obtained from a mercury arc tube. A polarizing potential is applied to the electrodes of the tube and the carrier current that is modulated by the light frequency varies the potential across two auxiliary electrodes placed in the mercury tube, whereby the oscillograph element reflects at a predetermined point in its path the light of that particular portion of the object at the transmitting station.

Current variations corresponding to variations in illumination of the light-sensitive device at the sending station are impressed, by any suitable means, on a transformer, the secondary of which is shown at 35 connected to two electrodes 36 and 37 in a mercury arc tube 38. The mercury arc tube 38 is provided with two electrodes 39 and 40 between which an arc is set up, being created by the voltage of the current supplied by the battery 41.

Changes in one of the position coordinates at the sending station produce, by any suitable means, changes of current in a transformer, the secondary 49 of which is connected to one coil 50 of an oscillograph 51. Changes in the other position coordinate at the sending station produce, by any suitable means, changes of current in a transformer, the secondary 55 of which is connected with a second coil 56 on the oscillograph 51.

The oscillograph 51 is provided with a mirror 57 that is adapted to reflect the light created by the mercury electron flow from the electrode 36 upon a photograph negative 58. The light created by the electron stream flowing from the electrode 36 is focused, by means of a system of lenses 59, upon the mirror 57. A lens or system of lenses 60 focus the light reflected by the mirror 57 of the oscillograph on the photograph negative 58.

Having described the apparatus shown in the drawings, I will now explain its detailed operation.

At the sending station, any suitable scanning device produces changes in each of the two coordinates of the selected point in the object being scanned, whereby the point selected changes from moment to moment. Any suitable light-sensitive device is included in the sending apparatus and is illuminated at each moment in accordance with the brilliance of the point of the object selected at that moment. Suitable sending devices and cooperating receiving devices produce currents at the receiving station corresponding to the changes at the receiving station. Currents corresponding to changes in one coordinate of the selector point are delivered to transformer 49 and thus are applied to the winding 50 of the oscillograph 51. The mirror 57 of the oscillograph thus swings in one direction.

Similarly, currents corresponding to changes in the other coordinate of the selected point are delivered to transformer 55 and thus are applied to the detector triode 53. The detector triode 53 then operates to supply current of the same frequency as that supplied by the alternator 10 to the winding 56 of the oscillograph 51.

The resultant operation of the mirror 57 under influence of the current in the coils 50 and 56 corresponds to the selection of the point in the object. Thus, the mirror 57 selects on the negative 58 a point corresponding to the synchronously selected point of the object.

The voltage applied to the electrodes 39 and 40 of the mercury tube 38 creates an arc. The mercury vapor will fill the tube 38 including that portion of the tube in which the electrodes 36 and 37 lie. However, the principal luminosity will be in close proximity to the two mercury pools or electrodes 39 and 40, inasmuch as the greatest current flow takes place at that point. There will be very little luminosity in the portion of the tube in which the electrode 36 lies. It is well known that, when potential is applied between the electrodes 36 and 37, there will be some energy dissipated to increase the luminosity of the gas around these electrodes. As the energy dissipated is directly proportional to the voltage applied between the electrodes 36 and 37, the luminosity of the mercury vapor in proximity to the electrode 36 is directly proportional to the voltage applied between the electrodes 36 and 37. This change in luminosity under variation in impressed voltage between the electrodes 36 and 37 is nearly instantaneous.

At the receiving station, at any instant, the mirror 57 of the oscillograph 51 will be in the corresponding position to the selected point in the object.

The current in transformer 35 at this instant will correspond to the illumination of the light-sensitive device at the sending station and therefore to the brightness of the point in the object selected at this instant. This current then creates a potential between the electrodes 36 and 37. Thus, the voltage applied between the electrodes 36 and 37 of the mercury tube 38 corresponds to the illumination of the light-sensitive device. Consequently, the luminosity of the mercury vapor around the electrode 36 is varied to correspond to the intensity of the light reflected from that particular portion of the object at the transmitting station. This light is reflected by means of the oscillograph element 57 to the same corresponding position on the photograph negative 58.

In the same manner, each particular point on the object is transmitted to the receiving station and recorded thereat upon the photograph negative. This operation takes place in 1/20 of a second, it will therefore be seen that any motion of the object at the transmitting station may be recorded at the receiving station, by reason of the persistency of vision phenomena. It is obvious that to record this would, of course, necessitate a recording means similar to a motion picture camera.

It is, of course, obvious that it is not necessary to use a photographic recording means and that the image will be visible to any one at the receiving station.

It is also obvious that the alternators 10 and 11 may be located at a central station. In this case, the alternators would modulate a carrier current of a predetermined frequency. This modulated carrier current would then be received at the transmitting station and be detected, and the resultant currents applied to the two windings of the oscillograph. The detected circuits in this case would be similar to those shown in the receiving station. The operation of this apparatus with this construction will be apparent without further explanation.

I claim as my invention:

1. In a television system, a variable-brilliancy light source comprising an evacuated envelope, means for producing an ionized atmosphere in said envelope, said means including two electrodes maintained at a difference of potential and means for varying the potential gradient in a portion of said ionized atmosphere along a line outside the electron stream established by said first-named means, said last-named means being wholly distinct from the means for producing an ionized atmosphere.

2. In combination, a source of light of variable intensity comprising an envelope, means for producing an atmosphere of ionized mercury in said envelope, and separate means for producing a space-current through said ionized atmosphere, at least a portion of said last-named means being so located that it is little illuminated by said first-named means.

In testimony whereof, I have hereunto subscribed my name this 13th day of March, 1924.

VLADIMIR K. ZWORYKIN.